US008447687B2

(12) United States Patent
Ogrodski (10) Patent No.: US 8,447,687 B2
(45) Date of Patent: May 21, 2013

(54) METHOD AND SYSTEM FOR CENTRALIZED IDENTITY AND ACCOUNT CONTROLS

(76) Inventor: Albert Ogrodski, Anaheim, CA (US)

( * ) Notice: Subject to any disclaimer, the term of this patent is extended or adjusted under 35 U.S.C. 154(b) by 261 days.

(21) Appl. No.: 12/749,605

(22) Filed: Mar. 30, 2010

(65) Prior Publication Data

US 2010/0250411 A1    Sep. 30, 2010

Related U.S. Application Data

(60) Provisional application No. 61/164,842, filed on Mar. 30, 2009.

(51) Int. Cl.
*G06Q 40/00* (2006.01)

(52) U.S. Cl.
USPC .............................................. 705/38; 705/30

(58) Field of Classification Search
USPC ...................................................... 705/10–44
See application file for complete search history.

(56) References Cited

U.S. PATENT DOCUMENTS

| 6,226,624 | B1 |   | 5/2001  | Watson et al. |
|-----------|----|---|---------|---------------|
| 6,354,490 | B1 | * | 3/2002  | Weiss et al. ............... 235/379 |
| 6,385,595 | B1 | * | 5/2002  | Kolling et al. ............... 705/40 |
| 6,493,685 | B1 | * | 12/2002 | Ensel et al. ............... 705/40 |
| 7,182,255 | B2 |   | 2/2007  | Mollett et al. |
| 7,668,773 | B1 | * | 2/2010  | Pruitt ............... 705/36 T |
| 7,676,433 | B1 |   | 3/2010  | Ross et al. |
| 7,739,169 | B2 | * | 6/2010  | Hammad ............... 705/35 |
| 7,870,242 | B2 | * | 1/2011  | Nguyen ............... 709/223 |
| 7,873,560 | B2 | * | 1/2011  | Reich et al. ............... 705/37 |
| 7,975,299 | B1 | * | 7/2011  | Balducci et al. ............... 726/22 |
| 8,061,597 | B2 | * | 11/2011 | Hogg et al. ............... 235/380 |
| 2002/0059107 | A1 | * | 5/2002  | Reich et al. ............... 705/26 |
| 2006/0204051 | A1 |   | 9/2006  | Holland |
| 2007/0294164 | A1 |   | 12/2007 | Wilhelm et al. |
| 2008/0021787 | A1 | * | 1/2008  | Mackouse ............... 705/17 |
| 2012/0109752 | A1 | * | 5/2012  | Strutton et al. ............... 705/14.58 |
| 2013/0013514 | A1 | * | 1/2013  | Mackouse ............... 705/44 |
| 2013/0041817 | A1 | * | 2/2013  | Greenwald et al. ............... 705/41 |

* cited by examiner

*Primary Examiner* — Frantzy Poinvil
(74) *Attorney, Agent, or Firm* — Taylor Russell & Russell, P.C.

(57) ABSTRACT

The method and system provides consumers with the ability to define and control their identity and accounts to minimize vulnerability to identity theft and credit fraud. This is accomplished using a centralized system where consumers can define their identity and account profile and define rules that control access to their identity and accounts. This process works independently of existing credit bureaus and credit authorization processes, creating a dual authentication and authorization system. The primary feature of the invention is a centralized database that is controlled by consumers. The database contains information and rules defined by the consumer that will proactively protect their identity and accounts. The idea is to minimize the allowable access to consumer's identity and accounts. This creates an additional layer of protection that eliminates fraud.

19 Claims, 9 Drawing Sheets

METHOD AND SYSTEM FOR CENTRALIZED IDENTITY AND ACCOUNT CONTROLS

This application claims benefit of U.S. Provisional Application No. 61/164,842, filed on Mar. 30, 2009.

BACKGROUND

The Secret Service and the Federal Trade Commission say "Identity theft is quickly becoming a legitimate threat to every American. It is the fastest growing crime in the United States". Identity theft and credit fraud continue to cost billions of dollars and violate the privacy of millions of consumers every year. The FBI's Financial Report to the Public for 2007 reports fraud losses of $52.6 billion, affecting 9.91 million Americans. Fraudsters routinely steal consumers' personal information and then proceed to use this information to open new accounts and/or use existing accounts.

By the time a consumer realizes they are a victim of identity theft, it is usually too late as the charges have already occurred and the information has been reported to the credit bureaus. There are limitations and safeguards put in place by card issuers usually limiting the financial liability of an identity theft victim to $50 per card (which is often waived). The erroneous data reported to the credit bureaus has a negative impact on a consumers' ability to obtain new credit and can damage their credit score resulting in a much higher cost to borrow money. The victim will spend countless hours, often spanning months and years, attempting to undo the damages caused by the fraudster. They also have to perform the repair process with up to three credit bureaus. The cost and stress of repairing a consumer's credit history is undesirable and should be eliminated.

Today's current systems facilitating the credit process have many inherent weaknesses that continue to be exploited by fraudsters. New account creation and credit account authorization is a highly automated process that has no accurate way to verify the true identity of the consumer. When a card is lost or stolen, it remains active until the card holder notifies the issuer. The credit bureaus are based on historical data which is reported well after a transaction has been completed. Anti-fraud solutions are based on predictive analysis, which attempts to curtail fraud and at the same time, has to minimize false positives in order to protect the legitimate consumer transaction. Unfortunately, none of these systems can proactively stop fraudulent activity which is why identity theft and credit fraud continues to be a serious problem. The existing processes do not provide consumers with any ability to centrally control how, when, and where their identity and credit are used.

SUMMARY

The purpose of the invention is to empower consumers with the ability to define and control their identity and accounts minimizing their vulnerability to identity theft and credit fraud. This is accomplished using a centralized system where consumers can (1) define their identity and account profile and (2) define rules that control access to their identity and accounts. This process works independently of existing credit bureaus and credit authorization processes creating an innovative dual authentication and authorization system. The primary feature of the invention is a centralized database that is controlled by consumers. The database contains information and rules defined by the consumer that will proactively protect their identity and accounts. The idea is to minimize the allowable access to consumer's identity and accounts. This creates an additional layer of protection that eliminates fraud. It is one thing for a fraudster to assume a consumer's identity and account information, but it is highly unlikely the fraudster will also know a consumer's identity and account profile rules defined in an independent system.

Parents may also register their children's identity information and in the unfortunate case of a missing child, the information can be quickly forwarded to law enforcement authorities. In extreme cases, a parent can post a child's identity information (e.g., biometrics) and the missing child could potentially reconnect with their parents in the future. Consumers can also order credit reports, monitor their credit reports, request fraud alerts, request credit freezes, and report lost or stolen credit cards.

The system provides added safeguards to those provided by the credit bureaus. Consumers can currently file fraud alerts or credit freezes with each of the three credit bureaus. A key provision of the Fair and Accurate Credit Transactions Act of 2003 is the consumer's ability to place a fraud alert on their credit record. A consumer would use this option if they believe they were a victim of identity theft. The fraud alert requires any creditor that is asked to extend credit to contact the consumer by phone and verify that the credit application was not made by an identity thief. Although this is a major component of the current fight against identity theft, once a fraudster steals a consumer's identity, they most likely will have complete access to manipulate the fraud alert by simply redirecting the contact information so it goes straight to the fraudster for approval of their own fraudulent transaction. A credit freeze is the next level of protection offered by the credit bureaus. State legislation requires the credit bureaus to allow consumers to freeze or lock-down their credit history. This is effective in blocking creditors from issuing new credit provided a credit report is requested and reviewed prior to issuing new credit. It too can be circumvented by a fraudster who has successfully stolen a consumer's identity. The credit bureaus typically charge a fee for each fraud alert or credit freeze (activation or inactivation) and require it to be renewed (typically every 90 days). This must be performed with each of the three credit bureaus to be effective. The timeliness of these requests is sometimes slow and can cause delays in getting credit.

The system allows consumers to log on to a secure web site using advanced authentication methods and create their own consumer profile. The consumer defines rules determining how, when and where new accounts can be established in their name or how, when and where their existing accounts can be used. The new account authorization rules are based on, but not limited to, account types, credit limits and identification requirements. Consumer identification information (e.g., pictures, physical description, biometrics, etc.) can also be defined to assist in the identification process. The account profile rules can be based on data available in the authorization transaction (e.g., geography, merchant, product, and amount).

The consumer profile is accessed during the existing account authorization process in real-time either before, parallel to, or after the existing credit authorization process. Information from the transaction is provided to the system which verifies the consumer has authorized the transaction. If the consumer has authorized the transaction, then the transaction is authorized pending an approval from the account issuer. If the consumer has not authorized the transaction, then the transaction is denied. This essentially creates a dual authorization process that becomes exponentially more difficult for a fraudster to defeat.

Consumers are entitled to know when their identity and accounts are accessed in real-time. Notifications can be configured to alert the consumer of transactions (authorized or denied) and provide the ability to override or update their consumer profile. The notifications can be sent in many formats including, but not limited to, email, text messages, or phone recordings.

BRIEF DESCRIPTION OF THE DRAWINGS

These and other features, aspects and advantages of the present invention will become better understood with regard to the following description, appended claims, and accompanying drawings wherein:

DETAILED DESCRIPTION OF THE DRAWINGS

Figure 1:
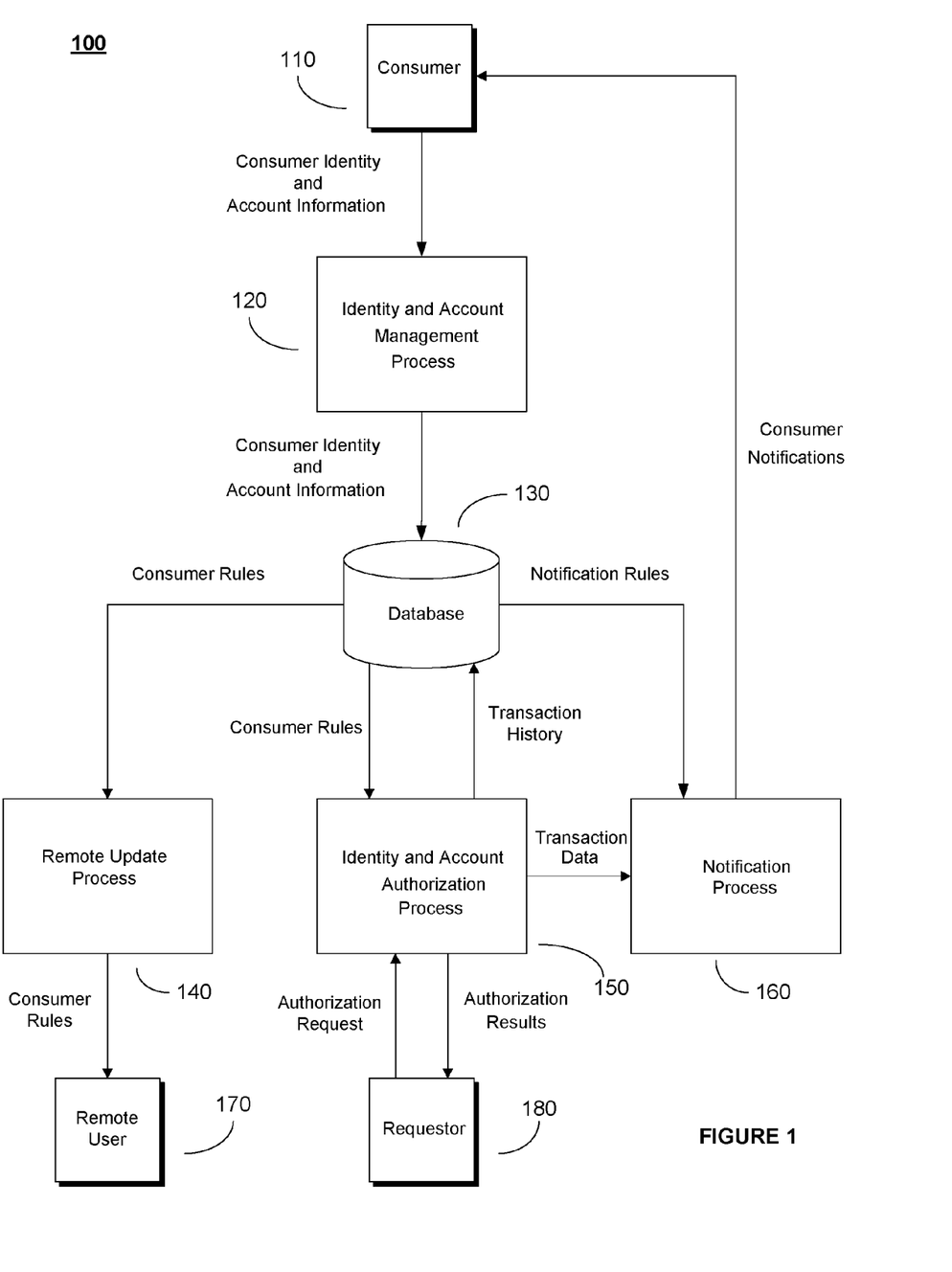
FIG. 1 is a functional diagram of the major elements of the disclosed method and system.

Turning to FIG. 1, FIG. 1 is a functional diagram 100 of the major elements of the disclosed method and system. The Centralized Identity and Account Controls method and system comprises four primary modules: Identity and Account Management Process 120; Identity and Account Authorization Process 150; Notification Process 160; and Remote Update Process 140. Each of the primary modules interacts with the central Database 130 that stores the consumer's profile and a transaction history of all authorization requests. The primary users of the method and system are consumers 110, requestors 180, and remote users 170. Consumers 110 are defined as individuals, families, and businesses. Requestors 180 are entities wishing to verify a consumer's identity or account. Requestors 180 include, but are not limited to, merchants, banks, automobile dealerships, government agencies, employers, fraud detection systems, credit bureaus, or utility companies. Remote users 170 are entities that prefer to integrate the system internally. A remote user 170 needs access to the consumer identity and account rules applicable to them in order to perform the identity or account authorization process.

The primary purpose of the Identity and Account Management Process 120 is to offer consumers 110 the ability to create and update their identity and account profile within a central location. This empowers consumers 110 with controls and oversight of all the information that defines their identity. A consumer's identity includes, but is not limited to, any information public or private that is specifically related to that consumer. The results of consumers 110 interacting with the Identity and Account Management Process 120 are the consumer's identity and credit data, which is stored in the Database 130. Requestors 180 may make authorization requests to and receive authorization results from the Identity and Account Authorization Process 150 to verify a consumer's identity or account. To respond to authorization requests from requestors 180, the Identity and Account Authorization Process 150 accesses consumer identity and account rules from and stores transaction histories to the Database 130.

Remote users 170 may make requests to the Remote Update Process 140 for access to the consumer identity and account rules stored in the Database 130 in order to perform identity or account authorization processes. The Remote Update Process 140 is available when an account issuer chooses to implement the solution internally and therefore needs a local and current copy of the consumer's identity and account rules. This system is based on guaranteed message delivery and provides real-time updates directly to the account issuer so they can incorporate the rules into their authorization process. This may be used to as a first pass to prevent the credit provider from paying unnecessary ancillary costs associated with today processes and procedures.

The Identity and Account Authorization Process 150 also provides transaction data to the Notification Process 160. The Notification Process 160 applies the transaction data from the Identity and Account Authorization Process 150 to the consumer notification rules stored in the Database 130 and sends notifications to the consumer 110 when the notification rules requirements are satisfied. The Notification Process 160 monitors the incoming authorization requests and based on the consumer's notification rules defined in the Identity and Account Management Process 120, sends real-time alerts directly to the consumer 110. Notification rules may be created, configured, and selected based on any data available in the transaction (e.g., transaction type, amount, and geography). For example, a consumer may configure a notification rule to alert them whenever a transaction is attempted outside their allowable footprint. Alternatively, they may define a notification rule to alert them when a credit transaction is more than $250. In some cases, the consumer may wish to receive a notification for all transactions. Automatic notifications can be delivered in many different ways, including but not limited to, email, text messages and phone recordings. The notifications include information about the transaction and the authorization results for the transaction. Each notification message will also contain the ability to manually override a declined transaction or apply an immediate stop to any further identity or credit transaction.

Figure 2:
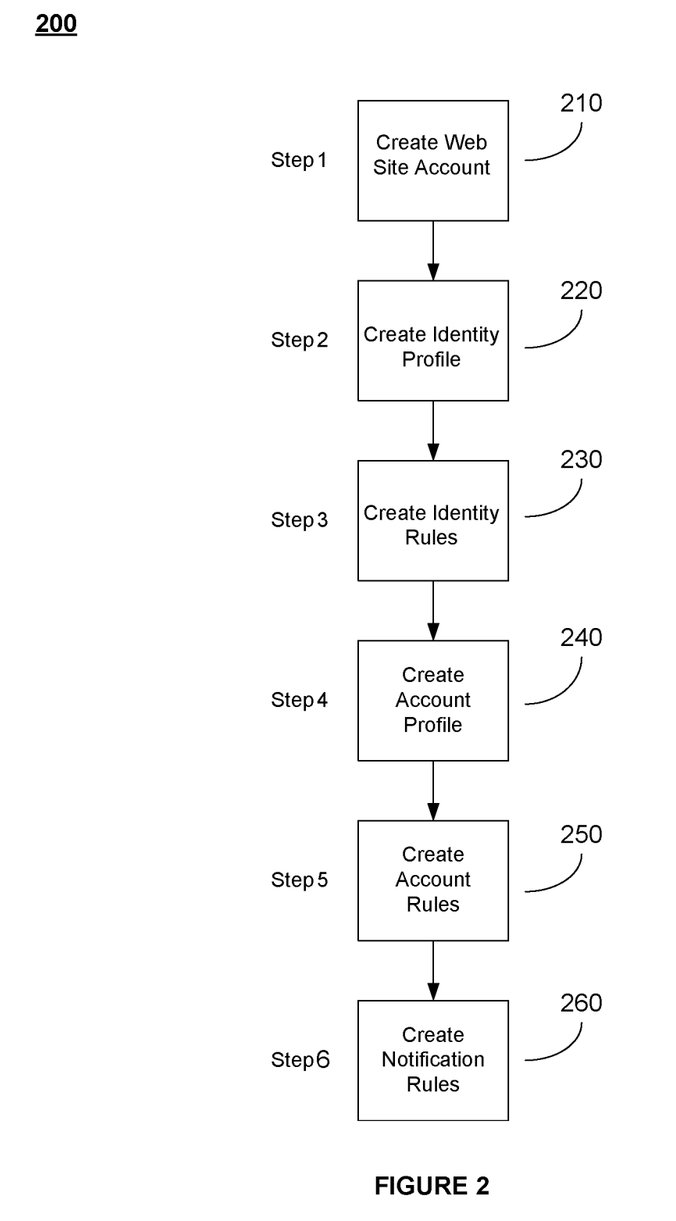
FIG. 2 illustrates the steps that are typically required to set up a consumer profile.

Regarding FIG. 2, FIG. 2 illustrates the process 200 that is typically required to set up a consumer profile using the Identification and Account Management Process (120 in FIG. 1). This is a web based application accessible to the consumer via, but not limited to, secure internet browsers and mobile devices. The consumer will typically perform the following steps to set up their consumer profile: Create Web Site Account 210; Create Identity Profile 220; Create Identity Rules 230; Create Account Profile 240; Create Account Rules 250; and Create Notification Rules 260.

The first step shown in FIG. 2 is for the consumer to create a web site account 210. The user creates a user id, password, and answers security related questions. The system generates a unique customer identifier that is associated with the new account. The system registers additional information regarding an authorized computer used to access the account including, but not limited to, IP address and unique hardware identifiers. The user may also request an external hardware key or other means and methods that will provide an additional layer of security. An email will be sent to the consumer to validate and complete the registration process. In the event the system detects a duplicate account being created using an existing identity, the information will be referred for further investigation and resolution.

The second step shown in FIG. 2 is for the consumer to create their identity profile 220. The user selects the appropriate account type, e.g., individual, joint, family, or business. Then the user enters some required and some optional confidential information in order to establish their identity including, but not limited to, social security number, federal identification number, name, address, phone numbers, email address, birth date, employer, passport data, and driver's license number. The user may optionally upload pictures, biometric data, and DNA profiles that can be used to prove their identity. In the case of joint or family profiles, the above steps will be repeated for each additional member.

The third step shown in FIG. 2 is for the consumer to create their identity rules and permissions 230. Consumers may configure and select rules defining how, when, and where their identity can be used or accessed. For example, if a consumer knows they won't be buying an automobile, they could prevent any new credit to be established in their name to purchase an automobile. When the consumer decides they are in the market to buy a new automobile, the consumer would temporarily turn off this rule to enable the transaction. After the consumer applies for the auto loan, the consumer could turn the rule back on preventing any other automobile loans to be obtained using their identity. Listed below are some, but not all examples of identity rules and their potential uses:

Deny any new account creation.
Deny access to their credit history.
Deny all address change requests.
Deny access to their children's identity information until they are 18.
Deny access to issue a new driver's license or other commonly used form or identification
Deny access to issue a passport.
Deny creation of utility accounts.
Deny access to the issuance or alteration of employment information.

The fourth step shown in FIG. 2 is for the consumer to create their account profile 240. The accounts are primarily credit or debit cards; however, any other type of account could be created including, but not limited to, bank accounts, cellular phone accounts, frequent flier accounts, utility accounts, and gift card accounts. The accounts can be added individually, uploaded from a credit report, or selected from existing accounts that have been identified by an account issuer to be made available to this process. Certain accounts can be verified with the account issuer prior to activation. For each account, information including, but not limited to, the account number, name, verification code, expiration date, and billing address is added to the profile.

The fifth step shown in FIG. 2 is for the consumer to create their account rules and permissions 250. Consumers may configure and select rules defining how, when, and where their accounts can be used or accessed. For example, a consumer may primarily use one of their credit cards to purchase fuel and groceries typically within their home city never exceeding a purchase amount of $100.00, between the hours of 8:00 a.m. and 8:00 p.m. on Tuesday's and Friday's. A rule can be created, configured, or selected to only allow the credit card to be used locally to purchase fuel or groceries not to exceed $100 per transaction between the hours of 8:00 a.m. and 8:00 p.m. and only on Tuesday's and Friday's. If the consumer decides they will be vacationing, the account rule can be changed to allow any charge within the geographical area or time when they will be traveling. Upon return from their vacation, they could reset the original rules. Another example might be a check book gets stolen on Saturday night. The consumer is unable to contact the bank to put a stop on the checking account until Monday morning. In this example, the consumer can access their account profile and halt all transactions associated with the stolen checkbook account in real time. Listed below are some other examples of account rules:

Completely block access to their accounts.
Define how many transactions can occur in a specified time period.
Do not allow any transactions to occur between a certain time frame (e.g., between 10:00 p.m. and 8:00 a.m.)
Only allow transactions to purchase certain goods (e.g., school books, food, and fuel).
Only allow transaction in a specific geographical area (e.g., Orange County, Calif.).
Do not allow any internet transactions.
Do not allow transactions exceeding a certain dollar amount during a specified time period.

The sixth step shown in FIG. 2 is for the consumer to create their notification rules 260. These rules define when and how the consumer is to be notified of certain transactions. Notification rules are defined at a high level so they apply to all identity and account rules. For example, a consumer may want to be notified via email any time an attempt is made to open new credit under their name. Listed below are some other examples of high-level notification rules:

Send a notification for any transaction.
Send a notification for any denied transaction.
Send a notification for any denied identity transaction.
Send a notification for any denied account transaction.

Identity rules 230, account rules 250, and notification rules 260 may be created, configured, and selected from various predefined rule profiles, predefined risk levels (e.g., low, medium, high) or by manually creating and configuring rules. They can also copy rules to use as a baseline for another rule. Rules can be applied globally and to specific identity rules and account rules. To assist the consumer in defining the most effective controls, the system offers rule selection recommendations based on historical transactions, risk level and override instances.

Figure 3:
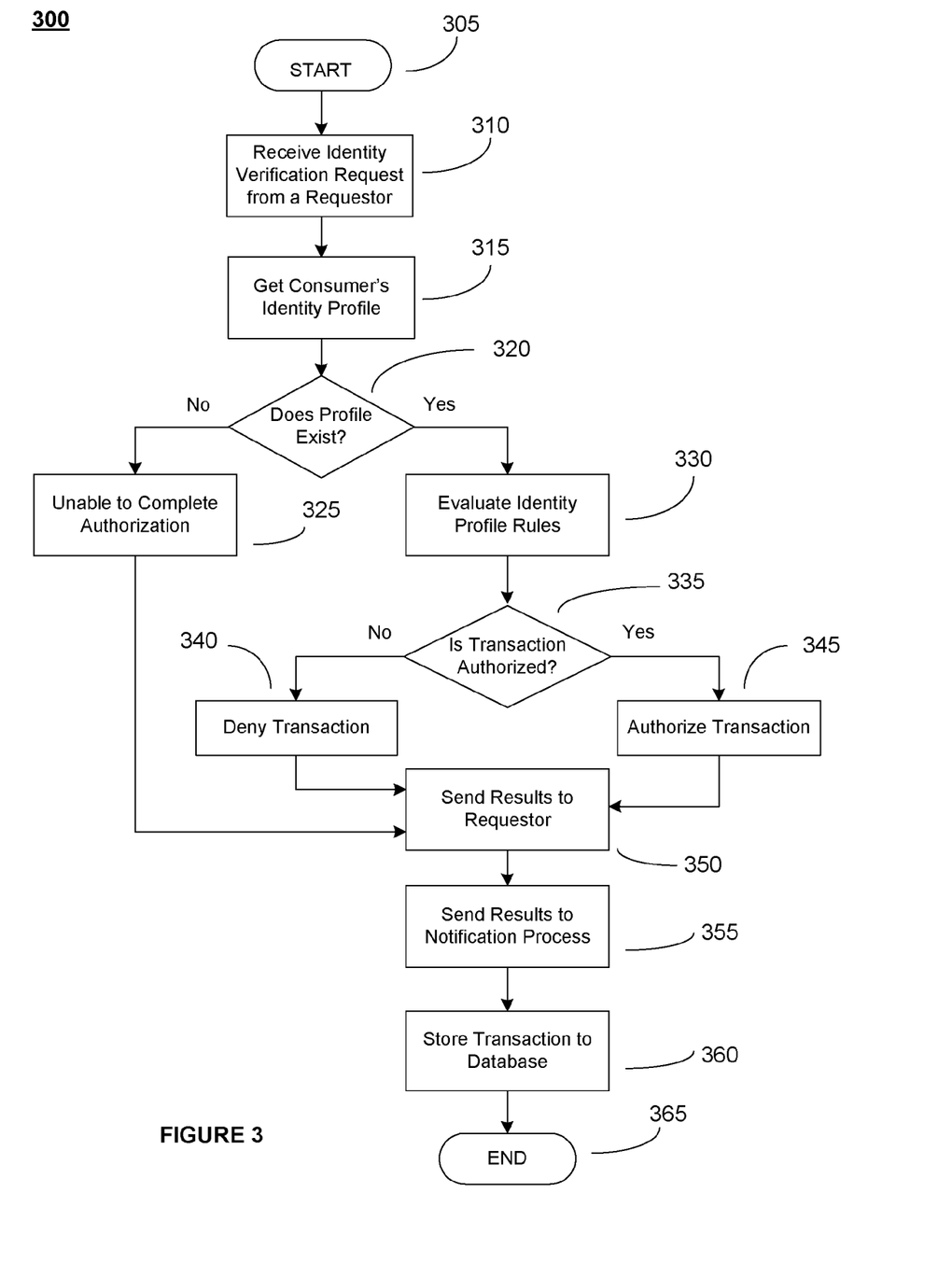
FIG. 3 shows an embodiment of a process for setting up and managing a consumer's identity profile rules.
Figure 4:
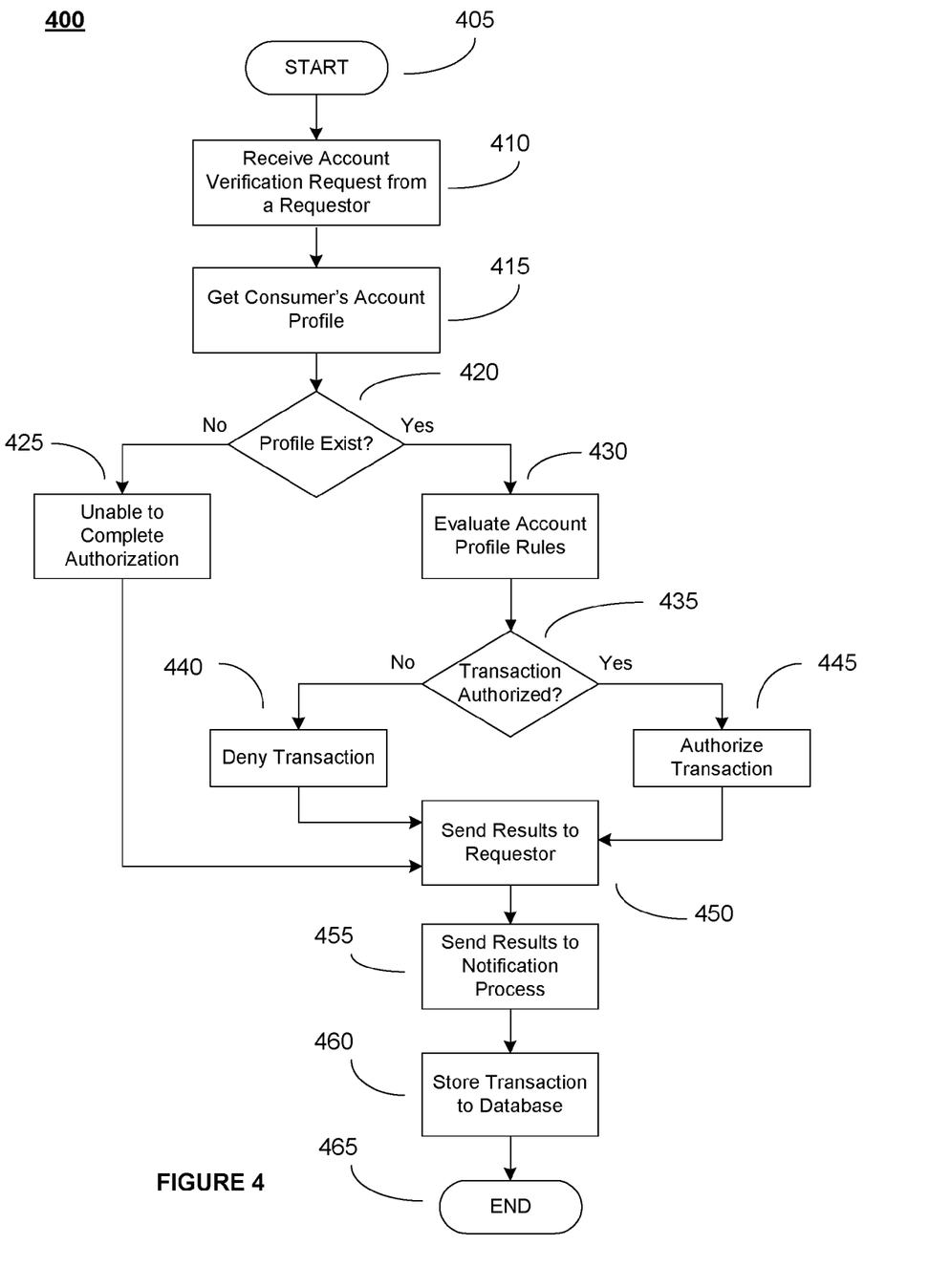
FIG. 4 shows an embodiment of a process for determining how the profile rules are used to screen transaction authorization requests.

The Identity and Account Authorization Process (150 in FIG. 1) verifies if a consumer has authorized a transaction using their identity or existing accounts. There are two variations of this authorization process as shown in FIG. 3 and FIG. 4. FIG. 3 shows an embodiment of a process 300 for using consumer's identity profile rules to determine how, when, and where a new account can be issued in the consumer's name. The process 300 comprises receiving an identity verification request 310, receiving the consumer's identity profile 315, and verifying if the consumer has a profile established in the central database 320. If a profile does not exist in the central database 320, the system is unable to complete the authorization 325, the results are sent to the requestor 350 and the notification process 355, and the transaction is stored in the database 360. If a profile does exist in the central database 320, the identity profile rules are evaluated 330 to determine if a transaction is authorized 335. During a request to verify a transaction against a consumer's existing account, the system retrieves the consumer's account rules and evaluates them based on the data provided within the transaction. If it is determined that the transaction is not authorized 335, the transaction is denied 340, the results are sent to the requestor 350 and the notification process 355, and the transaction is stored in the database 360. If it is determined that the transaction may be authorized 335, the transaction is authorized 345, the results are sent to the requestor 350 and the notification process 355, and the transaction is stored in the database 360. This information is available to generate reports for the consumer to help them better understand their identity and account usage. The information can also be used to provide recommendations to the consumer to tighten or loosen their profile footprint. A summary of all transactions and attempts can be used to validate any and all approved transactions to validate the credit provider's billing statement. Finally, the transaction is sent to the Notification Process to determine, based on the consumers profile rules and settings, if an alert will be generated to the consumer.

FIG. 4 shows the second variation which is an embodiment of a process 400 for using a consumer's account profile to determine how, when, and where their existing accounts can be used. Similarly to FIG. 3, the process 400 comprises receiving an account verification request 410, receiving the consumer's identity profile 415, and verifying if the consumer has a profile established in the central database 420. If a profile does not exist in the central database 420, the system is unable to complete the authorization 425, the results are sent to the requestor 450 and the notification process 455, and the transaction is stored in the database 460. If a profile does exist in the central database 420, the account profile rules are evaluated 430 to determine if a transaction is authorized 435. During a request to verify a transaction against a consumer's existing account, the system retrieves the consumer's account rules and evaluates them based on the data provided within the transaction. If it is determined that the transaction is not authorized 435, the transaction is denied 440, the results are sent to the requestor 450 and the notification process 455, and the transaction is stored in the database 460. If it is determined that the transaction may be authorized 435, the transaction is authorized 445, the results are sent to the requestor 450 and the notification process 455, and the transaction is stored in the database 460. This information is available to generate reports for the consumer to help them better understand their identity and account usage. The information can also be used to provide recommendations to the consumer to tighten or loosen their profile footprint. A summary of all transactions and attempts can be used to validate any and all approved transactions to validate the credit provider's billing statement. Finally, the transaction is sent to the Notification Process to determine, based on the consumers profile rules and settings, if an alert will be generated to the consumer.

In the event an emergency override is required by a consumer, access can be provided through a telephone system. The consumer will be prompted through several security questions and upon successfully passing the security requirements, the consumer can override or modify the rule prohibiting a certain transaction. A notification will be sent to the consumer advising them of the override. Overrides can also be performed from an email or text notification advising the consumer of a declined transaction. For example, a consumer has created a rule to prevent any cash withdrawals from their debit card. They also created a notification rule to alert themselves when there is an attempt to withdraw cash from their debit card. Now let's say the consumer has an emergency situation and needs to withdraw $300 using their debit card. They attempt to use their debit card but the transaction is denied based on their own account rules. An email notification is sent to them allowing them to update their account profile to allow the transaction. If the consumer is not able to retrieve the email notification, they could call the override service and, after completing the security process, update their account profile to allow the transaction.

Figure 5:
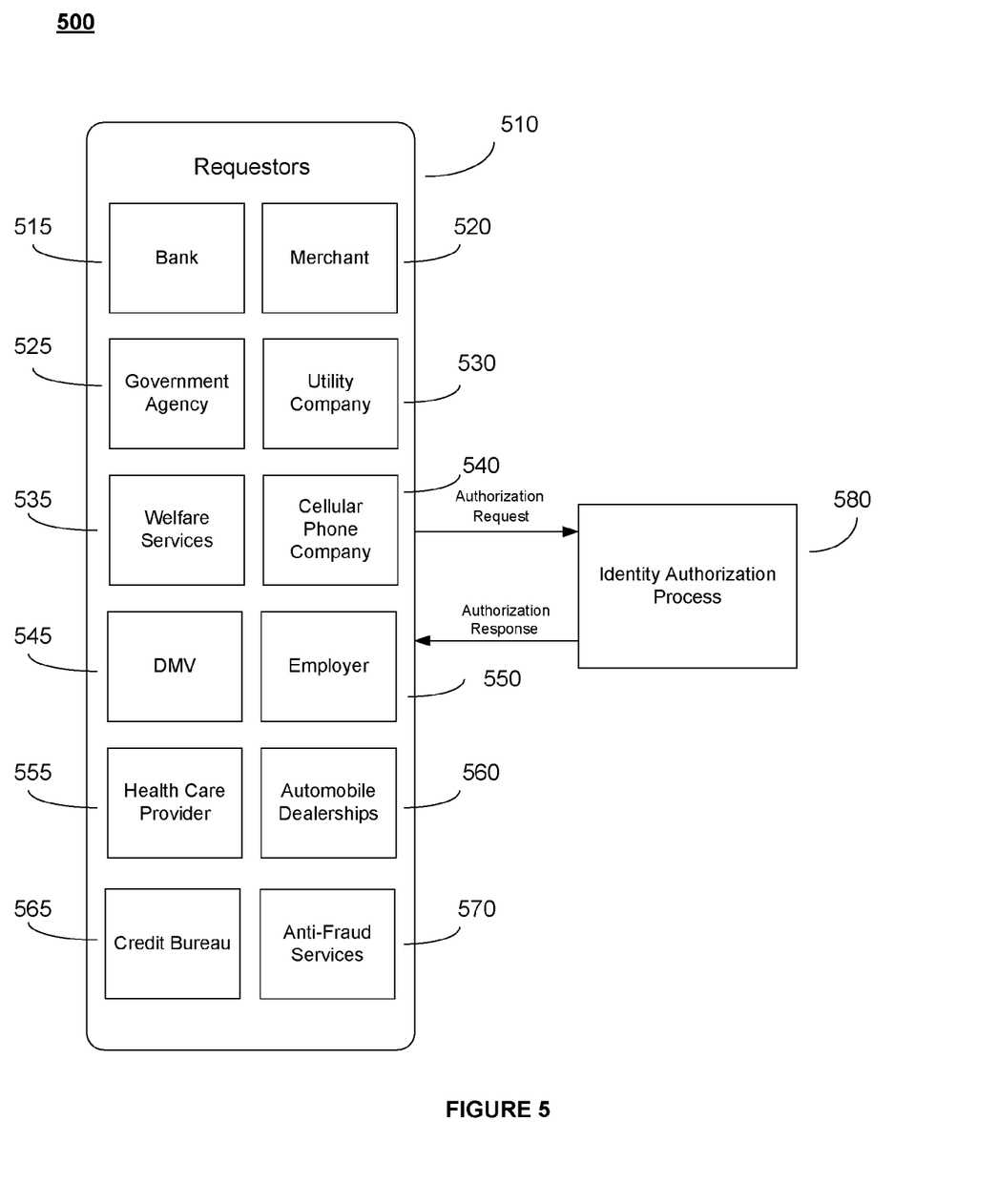
FIG. 5 shows typical third party requestors of identity authorization services.
Figure 6:
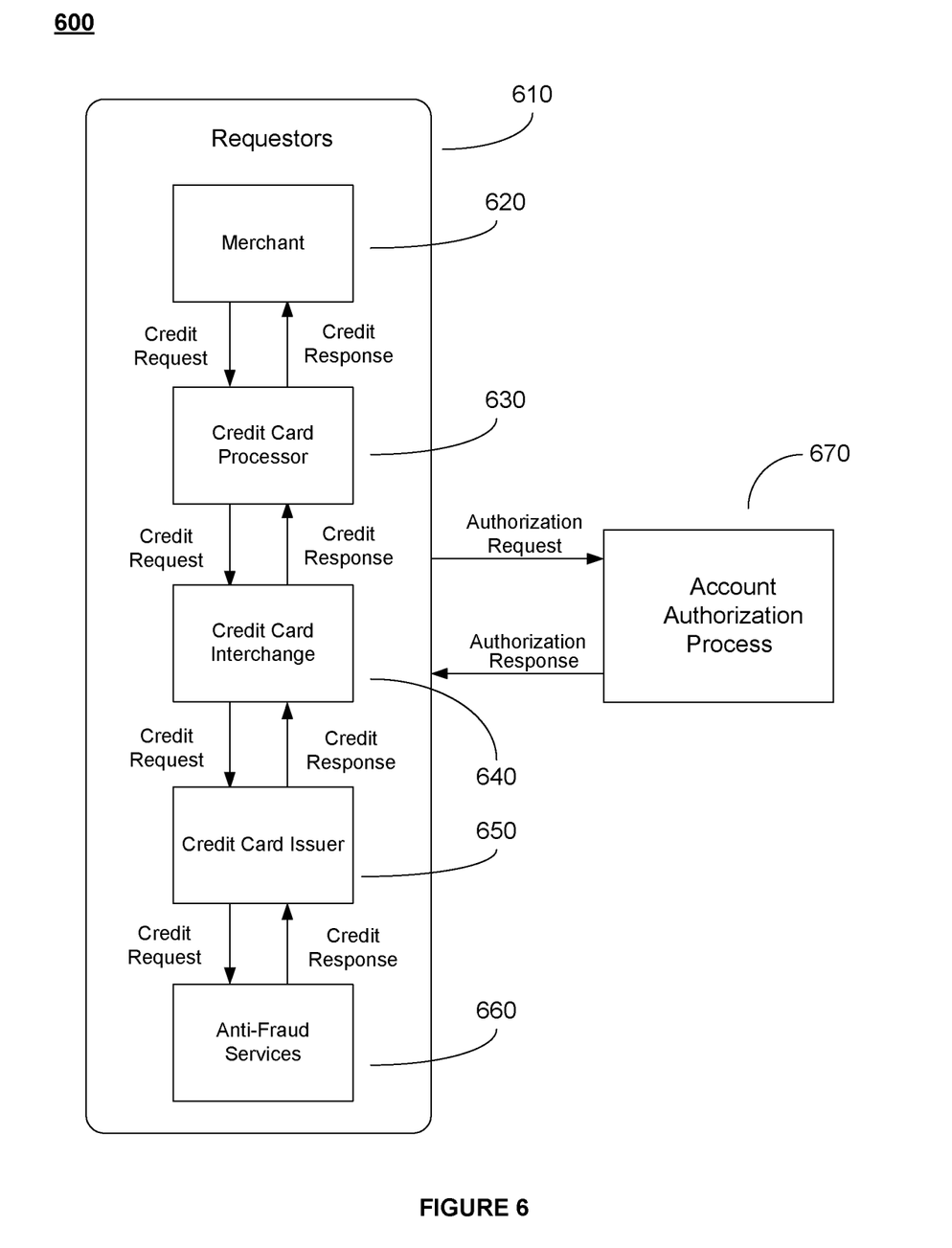
FIG. 6 shows an embodiment of an account authorization service process for third party requestors.

The Centralized Identity and Account Controls method and system provides two primary services that must be integrated into existing authorization processes. The first service verifies a consumer's identity prior to authorizing new credit, an account or other service, as shown in FIG. 5. The related identity authorization process is shown in FIG. 3. The second service authorizes a transaction utilizing an existing account, as shown in FIG. 6. The related account authorization process is shown in FIG. 4.

Regarding FIG. 5, FIG. 5 shows an embodiment 500 of typical third party requestors 510 of identity authorization services 580 (see 150 in FIG. 1). The identification authorization service 580 integrates to any third party requestors 510 wishing to perform an identity verification and authorization. This includes, but is not limited to, banks 515, government agencies 525, welfare services 535, Department of Motor Vehicles 545, health care providers 555, credit bureaus 565, merchants 520, utility companies 530, cellular phone companies 540, employers 550, automobile dealerships 560, and anti-fraud services 570. The requestor 510 communicates to the identity verification service 580 using a secure data transmission method. The requestor 510 provides transaction data, including but not limited to, Name, Identity Control Id, Social Security Number, Account Type and Transaction Type. The data is processed and an approval or denial is returned back to the requestor 510.

Figure 7:
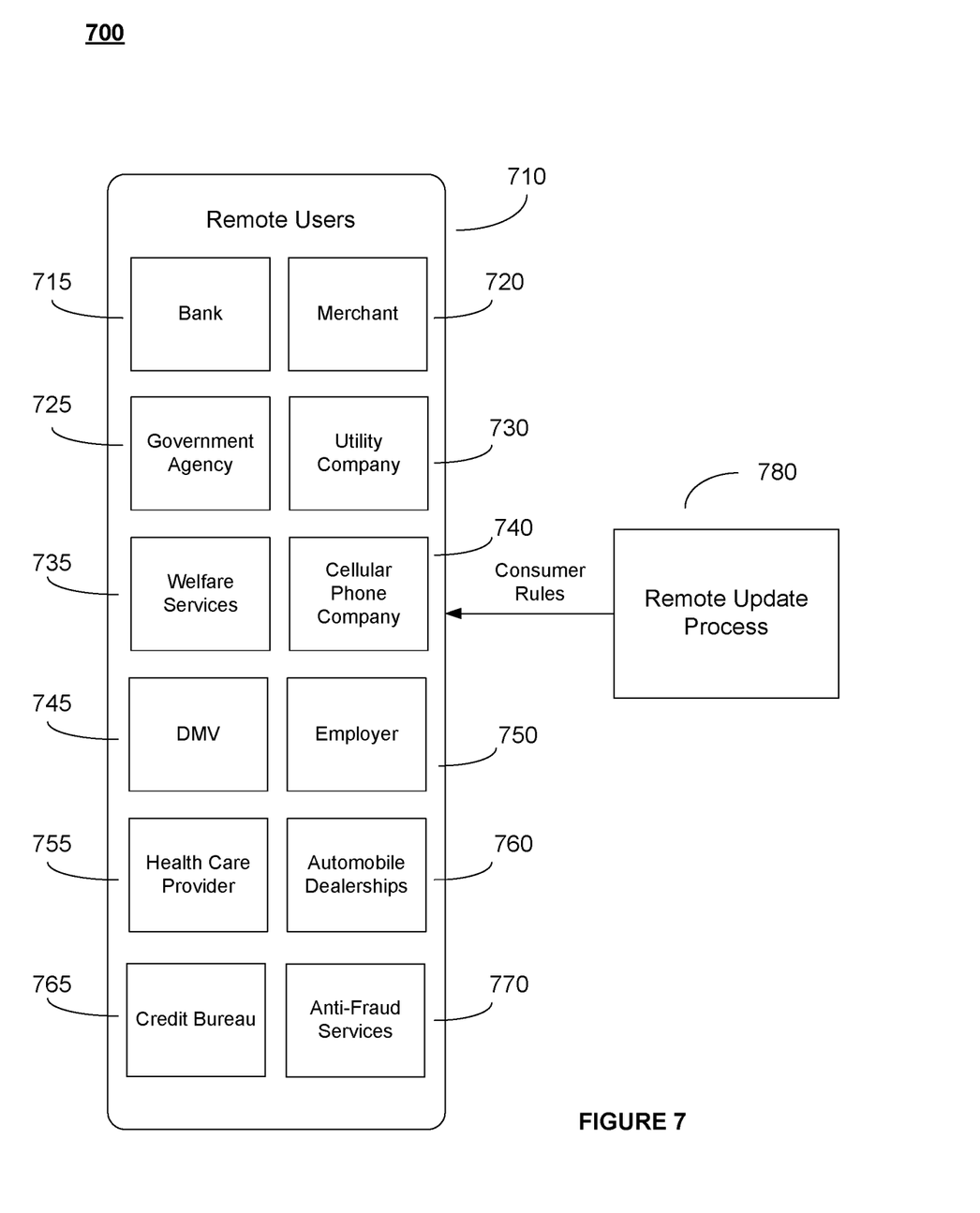
FIG. 7 shows typical remote users who may deploy the present method and system within their organization where remote updates are available.

Regarding FIG. 6, FIG. 6 shows an embodiment 600 of an account authorization service process 670 (see 150 in FIG. 1) for third party requestors 610. The account authorization service 670 integrates to the existing credit authorization process or directly to a requestor 610. There are several options to integrate with the existing credit authorization process including, but not limited to, merchants 620, credit card processors 630, the Credit Card Interchange 640, account issuers 650, and anti-fraud systems 660. In order to minimize the number of integrations, the preferred point of integration is with the Credit Card Interchange 640 and then the credit card processors 650. However, the account authorization service 670 can also be integrated at the point of sale 620. The requestor 610 communicates to the account authorization service 670 using a secure data transmission method. The requestor 610 provides transaction data, including but not limited to, name, account number, account type, expiration date, transaction type, amount, address, and product information. The data is processed and an approval or denial by the account authorization service 670 is returned back to the requestor 610. Regarding FIG. 7, FIG. 7 shows typical remote users 710 who may deploy the present method and system within their organization where remote update processes 780 are available. In addition to consumers and requestors, a third integration point is provided to support remote users (see 170 in FIG. 1) who choose to deploy the Centralized Identity and Account Controls system within their organization. The Remote Update Process 780 (see 140 in FIG. 1) sends real-time updates to the remote installation 710 using a secure data transmission method. A process based on guaranteed message delivery or a similar technology hosted at the remote deployment site will synchronize consumer rules stored at the remote site with real-time updates received from the Centralized Identity and Account Controls system as described herein. A centralized web site can provide additional services and support existing ancillary services related to identity theft and credit card fraud. This technology can be applied to many different identity and account related activities including, but not limited to, authorizing and controlling health care benefits 755, gift cards, debit cards, emergency relief cards, bank accounts 715, state identification cards 725, driver's licenses 745, welfare 735, voter registration 725, employment, frequent flier miles, bankruptcy, cellular phone service 740, home phone service, and other utilities 730. The remote users 710 may include the same entities as shown in FIG. 5 as requestors 510.

Figure 8:
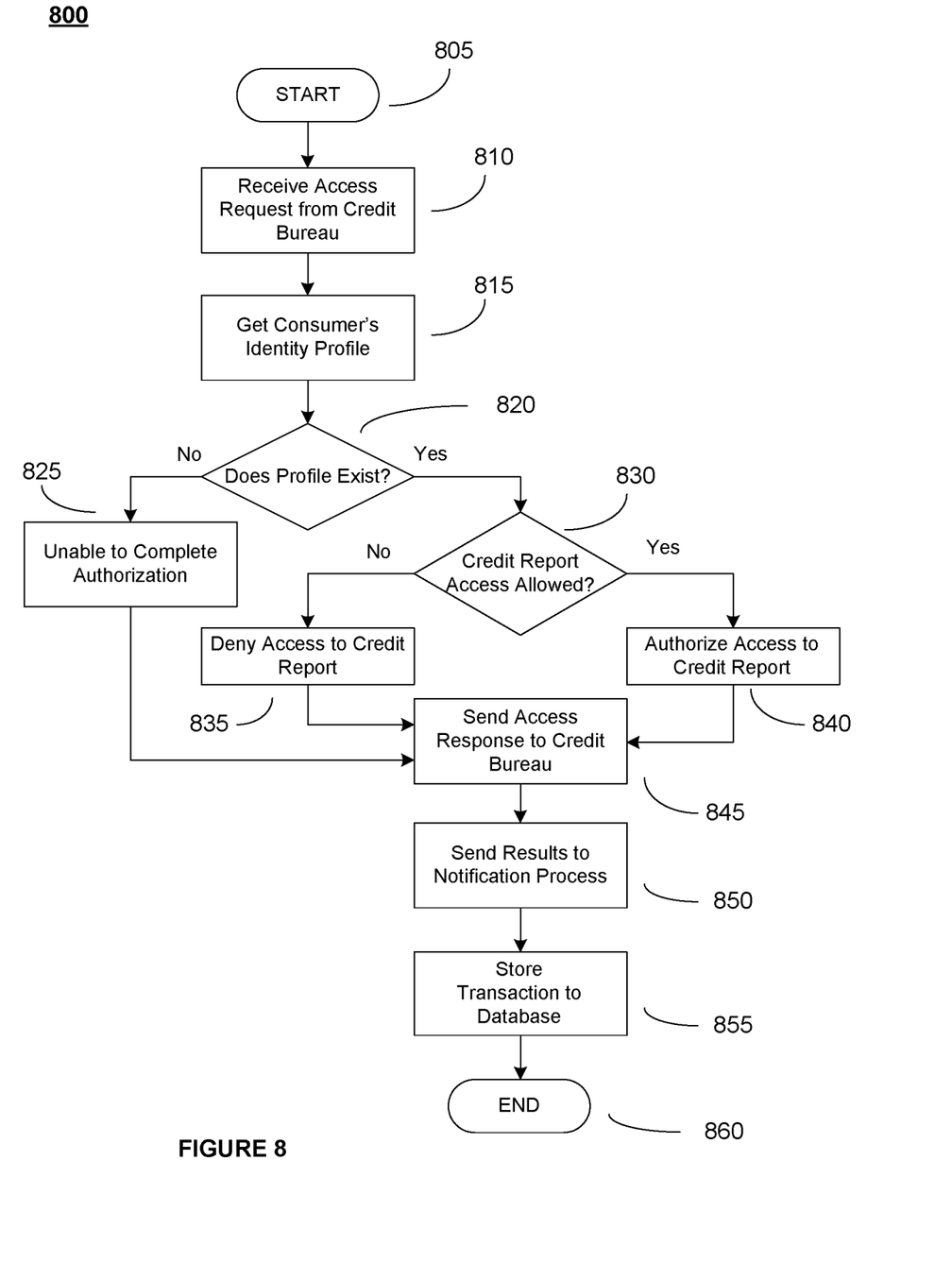
FIG. 8 shows an embodiment whereby the disclosed system and method is integrated with credit bureau systems.

Regarding FIG. 8, FIG. 8 shows an embodiment of a process 800 whereby the disclosed system and method is integrated with credit bureau systems (see 170 in FIG. 1). When integrated directly with credit bureaus, the system allows consumers to essentially block access to their credit reports by simply applying a rule to do so. This stays in place for as long as the consumer wants, can easily be reversed, and is real-time. When a credit report request is received by a credit bureau, an access request is received from a credit bureau 810, a consumer's identity profile is accessed 815. If the consumer identity profile does not exist 820, the authorization cannot be completed 825, an access response is sent to the credit bureau 845, results are sent to the notification process 850, and the transaction is stored to the database 855. If the consumer's identity profile does exist 820, it is determined if the profile allows credit report access 830. If credit report access is denied 835, an access response is sent to the credit bureau 845, results are sent to the notification process 850, and the transaction is stored to the database 855. If credit report access is authorized 840, an access response is sent to the credit bureau 845, results are sent to the notification process 850, and the transaction is stored to the database 855.

Figure 9:
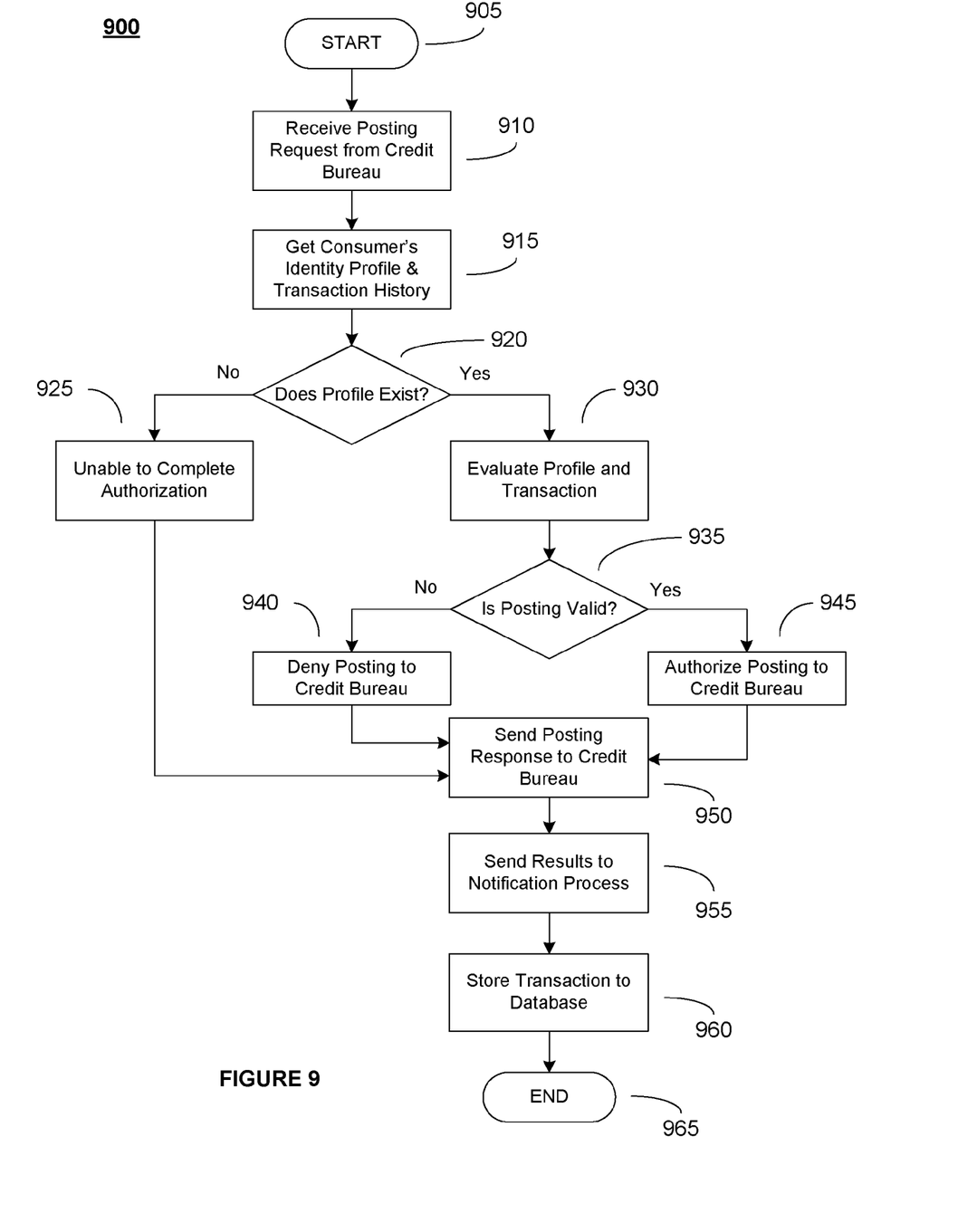
FIG. 9 shows an embodiment of consumer controls to prevent inaccurate postings to credit bureaus.

Regarding FIG. 9, FIG. 9 shows an embodiment of consumer controls 900 to prevent inaccurate postings to credit bureaus. This additional layer of consumer controls can also prevent inaccurate postings to the credit bureaus. Agreements with the credit bureaus can be established to prevent them from posting any information to their credit repository unless the transaction was previously approved by the system. This will prevent fraudulent transactions from affecting a consumer's credit report, eliminating the necessity for consumers to endure the difficulties, hardships, and undue costs associated with repairing their credit. When a posting request is created by a credit bureau, an posting request is received from a credit bureau 910, a consumer's identity profile and transaction history is accessed 915. If the consumer identity profile and transaction does not exist 920, the authorization cannot be completed 925, a posting response is sent to the credit bureau 950, results are sent to the notification process 955, and the transaction is stored to the database 960. If the consumer's identity profile and transaction history does exist 920, the identity profile and transaction history is evaluated 930, and it is determined if the posting is valid 935. If the posting is not valid 935, the posting is denied to the credit bureau 940, a posting response is sent to the credit bureau 950, results are sent to the notification process 955, and the transaction is stored to the database 960. If the posting is valid 935, the posting is authorized to the credit bureau 945, a posting response is sent to the credit bureau 950, results are sent to the notification process 955, and the transaction is stored to the database 960.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer-implemented method for preventing attempts by others to illegitimately use a consumer's identity data while providing legitimate requestors compliance status of identification requests, comprising carrying out steps of the computer-implemented method by a computer system with at least a processor and a memory, the computer-implemented steps of the method including:
   receiving the consumer's identity data from the consumer over a secure internet connection including consumer identity profile, consumer identity rules and notification rules;
   processing the consumer's identity data by an identity management process and storing the consumer identity data in a database;
   receiving an identity verification request from a legitimate requestor by an identity authorization process;
   accessing the consumer identity profile and identity rules from the database and evaluating the identity verification request by an identity authorization process for determining compliance or non-compliance with the consumer identity profile and consumer identity rules;
   notifying the legitimate requestor whether the identity verification request is compliant or non-compliant with the consumer identity profile and consumer identity rules;
   limiting access to the consumer's identity data stored in the database to the consumer, the identity management process, the identity authorization process and a notification process; and
   preventing access by others to the consumer's identity data stored in the database.

2. The computer-implemented steps of the method of claim 1, further including monitoring the identity verification request and evaluating the notification rules in the database by the notification process for providing consumer notification of compliant and non-compliant identity verification requests.

3. The computer-implemented steps of the method of claim 1, further including a remote identity authorization process for:
   receiving an identity verification request from a remote legitimate requestor;
   downloading the consumer identity profile and identity rules from the database and evaluating the remote identity verification request for determining compliance or non-compliance with the consumer identity profile and consumer identity rules;
   notifying the remote legitimate requestor whether the identity verification request is compliant or non-compliant with the consumer identity profile and consumer identity rules; and
   limiting access to the consumer's identity data stored in the database to the remote identity authorization process.

4. The computer-implemented steps of the method of claim 1, wherein the legitimate requestor is selected from the group consisting of a bank, merchant, government agency, utility company, welfare service, cellular phone company, division of motor vehicles, employer, health care provider, automobile dealership, credit bureau and anti-fraud service.

5. The computer-implemented steps of the method of claim 1, wherein the step of receiving the consumer's identity data from the consumer including consumer identity profile, consumer identity rules and notification rules for:
   creating a web site account;
   creating a consumer identity profile;
   creating consumer identity rules; and
   creating notification rules.

6. The computer-implemented steps of the method of claim 1, further including storing the identity verification request and the associated determination of compliance and non-compliance with the consumer identity profile and consumer identity rules in the database.

7. The computer-implemented steps of the method of claim 1, wherein the step of accessing the consumer identity profile and consumer identity rules from the database and evaluating the identity verification request by the identity authorization process for determining compliance with the consumer identity profile and consumer identity rules further includes:
- receiving an identity verification request from a legitimate requestor;
- determining if a consumer identity profile exists that matches data in the identity verification request;
- notifying the legitimate requestor when the identity verification request does not match data in the consumer identity profile;
- evaluating consumer identity rules associated with the consumer identity profile stored in the database when the identity verification request matches data in the consumer identity profile;
- notifying the legitimate requestor that the identity verification request is compliant or non-compliant with the consumer identity profile and consumer identity rules;
- sending a compliant or non-compliant determination to the legitimate requestor and the notification process; and
- storing the identity verification request and authorization determination in the database.

8. The computer-implemented steps of the method of claim 1, wherein the consumer identity rules for generating a non-complaint identity verification request are selected from the group consisting of denying a request for new account creation, denying a request for access to credit history, denying a request for address changes, denying a request for access the children's identity information, denying a request to issue a new driver's license, denying a request for new commonly used forms of identification, denying a request to issue a passport, denying a request to create new utility accounts, and denying a request for issuing or altering employment information.

9. The computer-implemented steps of the method of claim 1, wherein the data stored in the database is isolated from any transaction by others, including attempts to illegitimately access the consumer's identity data.

10. The computer-implemented steps of the method of claim 1, wherein the method provides a secondary layer of protection for the consumer.

11. A non-transitory computer-readable medium containing instructions for controlling a computer system to implement the method of claim 1.

12. A computer system for preventing attempts by others to illegitimately use a consumer's identity data while providing legitimate requestors compliance status of identification requests, comprising:
- means for receiving the consumer's identity data from the consumer over a secure internet connection including consumer identity profile, consumer identity rules and notification rules;
- an identity management function for processing the consumer's identity data and storing the consumer's identity data in a database;
- an identity authorization function for receiving an identity verification request from a legitimate requestor;
- the identity authorization function for accessing the consumer identity profile and identity rules from the database and evaluating the identity verification request for determining compliance or non-compliance with the consumer identity profile and consumer identity rules;
- means for notifying the legitimate requestor whether the identity verification request is compliant or non-compliant with the consumer identity profile and consumer identity rules;
- means for limiting access to the consumer's identity data stored in the database to the consumer, the identity management process, the identity authorization process and a notification process; and
- means for preventing access by others to the consumer's identity data stored in the database.

13. The computer system of claim 12, further comprising a notification function for monitoring the identity verification request and evaluating the notification rules in the database and for providing consumer notification of compliant and non-compliant identity verification requests.

14. The computer system of claim 12, further comprising a remote identity authorization function that includes:
- receipt of verification requests from a remote third party legitimate requestor;
- download of the consumer identity profile and identity rules in the database and evaluation of the remote identity verification request for determining compliance or non-compliance with the consumer identity profile and consumer identity rules;
- notification to the remote legitimate requestor whether the identity verification request is compliant or non-compliant with the consumer identity profile and consumer identity rules; and
- limits access to the consumer's identity data stored in the database to the remote identity authorization function.

15. The computer system of claim 12, wherein the legitimate requestor is selected from the group consisting of a bank, merchant, government agency, utility company, welfare service, cellular phone company, division of motor vehicles, employer, health care provider, automobile dealership, credit bureau and anti-fraud service.

16. The computer system of claim 12, wherein the identity authorization function for determining compliance with the consumer identity profile and consumer identity rules comprises:
- receipt of an identity verification request from a legitimate requestor;
- determination of whether a consumer identity profile exists that matches data in the identity verification request;
- notification to the legitimate requestor when the identity verification request does not match data in the consumer identity profile;
- evaluation of consumer identity rules associated with the consumer identity profile stored in the database to determine whether the identity verification request matches data in the consumer identity rules;
- notification to the legitimate requestor and the notification function that the identity verification request is compliant or non-compliant with the consumer identity profile and consumer identity rules; and
- the identity verification request and authorization determination being stored in the database.

17. The computer system of claim 12, wherein the consumer identity rules for generating a non-complaint identity verification request are selected from the group consisting of denying a request for new account creation, denying a request for access to credit history, denying a request for address changes, denying a request for access the children's identity information, denying a request to issue a new driver's license, denying a request for new commonly used forms of identification, denying a request to issue a passport, denying a request to create new utility accounts, and denying a request for issuing or altering employment information.

18. The computer system of claim 12, wherein the data stored in the database is isolated from any transaction by others, including attempts to illegitimately access the consumer's identity data.

19. The computer system of claim 12, wherein the method provides a secondary layer of protection for the consumer.

* * * * *